(12) United States Patent
Wennerström et al.

(10) Patent No.: US 7,721,320 B2
(45) Date of Patent: May 18, 2010

(54) STORAGE OF AUDIO/VISUAL PROGRAM DATA WITH ASSOCIATED PROMOTIONAL MATERIAL

(75) Inventors: Gerhard Wennerström, Ljungsbro (SE); Stefan Lennerbrant, Linköping (SE)

(73) Assignee: Nokia Corporation, Espoo (FI)

( * ) Notice: Subject to any disclaimer, the term of this patent is extended or adjusted under 35 U.S.C. 154(b) by 1873 days.

(21) Appl. No.: 09/963,598

(22) Filed: Sep. 27, 2001

(65) Prior Publication Data

US 2003/0061624 A1 Mar. 27, 2003

(51) Int. Cl.
*H04N 7/16* (2006.01)

(52) U.S. Cl. .......... 725/151; 725/36; 725/40; 725/59; 725/145

(58) Field of Classification Search .......... 725/41, 725/42, 36, 91, 40, 59, 145, 151; 709/219, 709/227; 386/46, 68, 69, 81, 125
See application file for complete search history.

(56) References Cited

U.S. PATENT DOCUMENTS

| | | | |
|---|---|---|---|
| 5,541,738 A | | 7/1996 | Mankovitz |
| 5,675,390 A * | | 10/1997 | Schindler et al. ............ 715/717 |
| 5,892,535 A * | | 4/1999 | Allen et al. .................... 725/36 |
| 5,892,536 A * | | 4/1999 | Logan et al. .................... 725/34 |
| 5,945,987 A * | | 8/1999 | Dunn ........................ 715/718 |
| 6,177,931 B1 * | | 1/2001 | Alexander et al. ............ 725/52 |
| 6,351,467 B1 * | | 2/2002 | Dillon ......................... 370/432 |
| 6,408,128 B1 * | | 6/2002 | Abecassis ..................... 386/68 |
| 6,505,240 B1 * | | 1/2003 | Blumenau ................... 709/218 |
| 6,564,005 B1 * | | 5/2003 | Berstis ........................ 386/83 |
| 6,698,020 B1 * | | 2/2004 | Zigmond et al. .............. 725/34 |
| 6,850,571 B2 * | | 2/2005 | Tardif .................... 375/240.21 |
| 6,944,877 B1 * | | 9/2005 | Lord et al. .................... 725/32 |
| 2001/0013125 A1 * | | 8/2001 | Kitsukawa et al. ............ 725/36 |
| 2001/0049820 A1 * | | 12/2001 | Barton ......................... 725/32 |
| 2002/0129375 A1 * | | 9/2002 | Kim et al. ................... 725/100 |
| 2002/0133830 A1 * | | 9/2002 | Kim et al. ................... 725/142 |
| 2003/0018745 A1 * | | 1/2003 | McGowan et al. .......... 709/217 |
| 2003/0026424 A1 * | | 2/2003 | McGarrahan et al. ....... 380/255 |
| 2003/0121041 A1 * | | 6/2003 | Mineyama ................... 725/46 |

* cited by examiner

*Primary Examiner*—Christopher Kelley
*Assistant Examiner*—Charles N Hicks
(74) *Attorney, Agent, or Firm*—Ditthavong Mori & Steiner, P.C.

(57) ABSTRACT

A multimedia apparatus, such as a set top box for use with a television set, comprises a receiver for receiving program data from a communication channel and a processor which stores said program data with a file containing associated secondary program data, such as a promotional trailer. The processor compiles a menu of secondary program data files allowing a viewer to watch a trailer and decide whether to retrieve the full program or film. The secondary data may be broadcast in parallel with the program data. Alternatively, the processor may run an application for producing the secondary program data, e.g. using earmarked portions of the full program data.

42 Claims, 4 Drawing Sheets

STORAGE OF AUDIO/VISUAL PROGRAM DATA WITH ASSOCIATED PROMOTIONAL MATERIAL

FIELD OF THE INVENTION

This invention relates to multimedia equipment comprising a data processor in which data is written to and read from a storage medium and has particular, but not exclusive, application to set top boxes for televisions.

BACKGROUND

Set top boxes can be used to receive satellite, terrestrial and cable transmissions and to process them into a format suitable for reception by a conventional television set. Recently, it has been proposed to include a hard drive in a set top box to allow digital satellite and cable transmissions to be recorded and played back later. The received program information may be in MPEG-2 format. The set top box receives a stream of digital data from the satellite or cable link, parses it, and feeds it through a processor, so that the program data is recorded digitally in files in a local storage medium, e.g. a hard drive or Winchester disc. The program data can then be accessed from the hard drive, relayed through a conventional video decoder and fed to the television set.

It is likely that the capacity of suitable hard discs will increase to hundreds of hours so that a set top box may be used to store one or more whole days of programming content broadcast on a communication channel. This is in marked contrast to the conventional use of a videocassette recorder (VCR), which can only store a few hours of programming content on videotape. Here, a viewer decides which programs they would like to watch in advance of their transmission and records a selected number. With an increased capacity, a set top box may store a large number of programs, allowing a user to make viewing decisions after the recording has been made.

Furthermore, when a viewer watches television broadcasts as they are transmitted, it is possible for a content provider to promote their programs using trailers, potentially raising the viewer's interest in programs of which they were unaware. However, where a large number of programs have been stored, such as a full day's output from a television channel, it is more difficult to raise the viewer's interest in programs that have been inadvertently or unintentionally recorded.

Proposals have been made previously for sending trailers. U.S. Pat. No. 5,541,738 discloses sending trailers in advance to a program guide and downloading them to a video recorder so that the recorder can be primed in advance to record a program broadcast later. U.S. Pat. No. 5,945,987 discloses sending trailers from a video on demand system to customers. The user can browse trailers and jump between them in real time before choosing and downloading an associated program.

SUMMARY OF THE INVENTION

The invention provides a multimedia apparatus that comprises a receiver, a data storage medium and a processor. According to the invention in one aspect, the receiver is configured to receive primary program data and associated secondary program data from a communication channel, and the processor is operable to record the primary program data and the associated secondary program data on the data storage medium, provide a user interface for selection of the program data files and retrieve a secondary program data file selected by a viewer for display, for example through a conventional television set.

The secondary program data may be broadcast in parallel with the main program content.

In another aspect, the data processor is operable to record primary program data on the storage medium, and run a software agent that compiles an associated secondary program data file, provides a user interface for selection of the stored program data files and retrieves a secondary program file selected by a viewer for display.

The software application may compile the secondary data by storing parts of the main broadcast that have been earmarked by the broadcaster and adding an audio soundtrack broadcast as tertiary data through the channel.

The primary and secondary program data may be in the form of MPEG-2 files, and the secondary data may be of a lower resolution than the primary program data. The associated program material may be in one or more of the following forms: audio, video, pictures, text or graphics.

The invention allows a program to be stored with a separate file of related promotional material, e.g. a trailer, sample footage or additional information relating to the program. The user may access the promotional material of one or more programs when making a viewing decision.

BRIEF DESCRIPTION OF THE DRAWINGS

In order that the invention may be more fully understood, an embodiment thereof will now be described by way of example with reference to the accompanying drawings in which.

DETAILED DESCRIPTION

Figure 1:
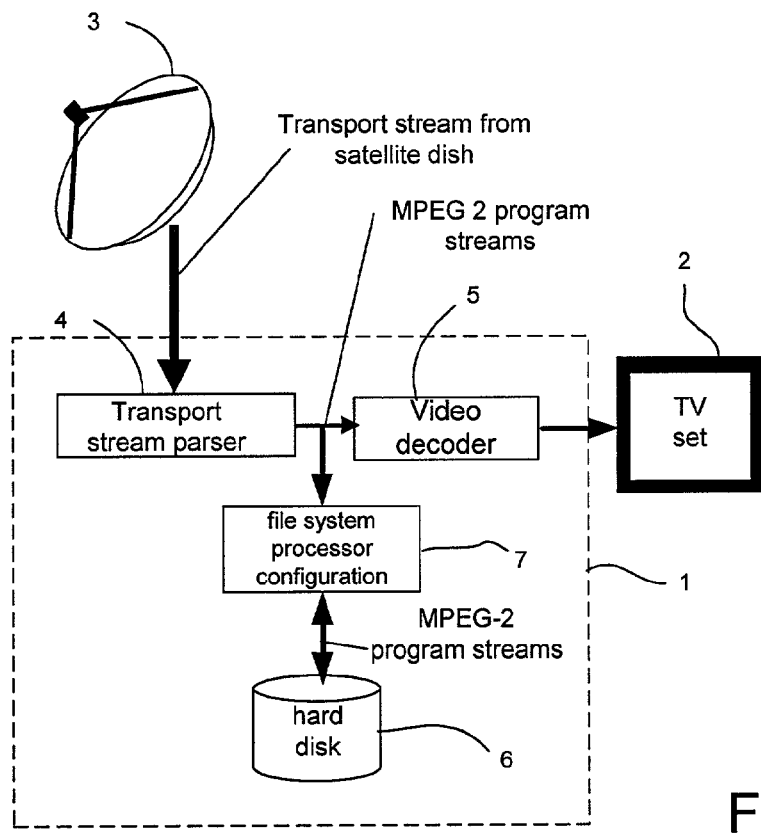
FIG. 1 is a schematic block diagram of a set top box incorporating data processing apparatus according to the invention, during recording of a program.

FIG. 1 illustrates a set top box incorporating data processing apparatus according to the invention, during a recording of a program. The set top box is shown within hatched outline 1, connected between a conventional television set 2 and a satellite dish antenna 3.

The dish antenna 3 receives satellite transmissions in digital MPEG-2 format, which are fed to a transport stream parser 4, to recover signal formatting information. A selected channel from the real-time transmission is fed to a conventional video decoder 5, which converts the digital signals into a suitable RF modulated form to be supplied to the aerial socket of the conventional TV set and into a format for a conventional SCART socket (not shown). Additionally, a program channel can be recorded in the digital MPEG-2 format in a store comprising a hard disc 6. Digital MPEG-2 signals from the parser 4 are processed by a file system processor configuration 7 to be recorded on the hard disc 6, with an associated file containing secondary program data, in a manner to be described in more detail hereinafter.

Figure 2:
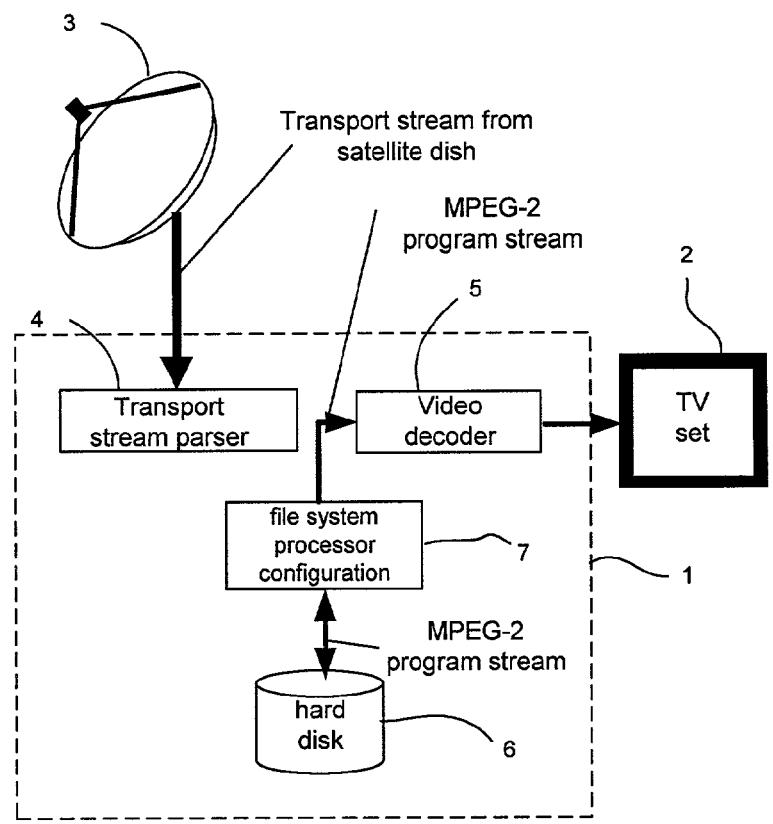
FIG. 2 corresponds to FIG. 1, during playback.

The configuration of the set top box during playback is shown in FIG. 2. The file system processor configuration 7 reads the stored MPEG data from the hard drive 6 and feeds it to the video decoder 5 so that the program can be replayed on television set 2.

Figure 3:
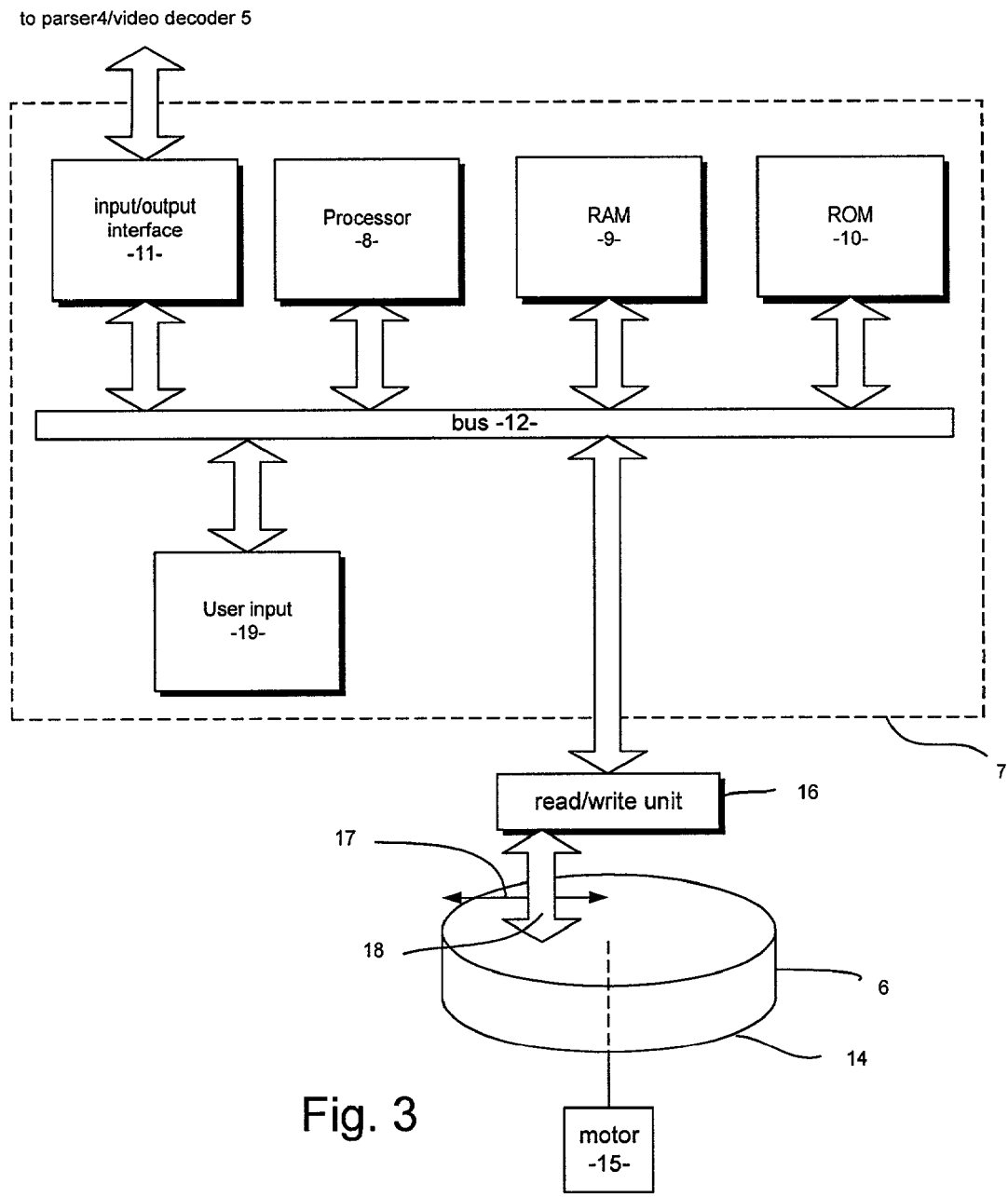
FIG. 3 is a schematic block diagram of the file system processor and hard drive shown in FIGS. 1 and 2.

The file system processor configuration 7 and the associated hard drive 6 are shown in more detail in FIG. 3. The processor configuration 7 includes a digital processor 8 such as an Intel Pentium™ with an associated RAM 9, ROM 10 and an input/output interface 11 that is configured to provide a signal connection to the parser 4/video decoder 5 shown in FIG. 2. These components are interconnected by common bus 12 in a manner well known per se.

The user input interface 19 is connected to the bus and receives control instructions from a user, for example, the selection of a recording mode or replay mode. Instructions may be provided to the interface 19 by means of a remote controller (not shown).

Figure 4:
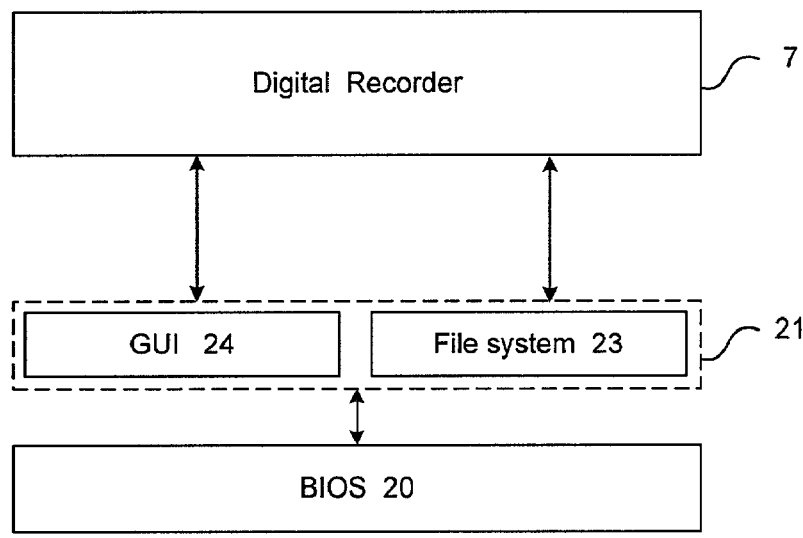
FIG. 4 illustrates schematically the software hierarchy utilised by the processor configuration shown in FIG. 3.

The overall configuration of the operating software for the processing configuration 7 is shown in FIG. 4. A BIOS 20 provides information interchange between the various components of the processor configuration 7 over the bus 12 shown in FIG. 3. An operating system 21 provides control of the BIOS 20. Examples of such an operating system are Microsoft™ Windows and Linux, although DOS or other operating systems well known in the art can be used. The operating system 21 allows application programs 22 to be run on the processor 8. The application governs control operation of the set top box so as to permit recording and replay of MPEG data together with other user selectable control functions. Viewing selections are made by the user through the input interface 19 shown in FIG. 3.

Programs and data are arranged in files which are grouped in directories referred to also herein as folders. The operating system 21 includes a file system 23 to allow files to be organised in a hierarchical structure, labelled, and amongst other things be written to and read from the hard drive 6. The operating system also includes a graphical user interface 24 which can be used to provide a display of the operational configuration of the set top box on the TV set 2 shown in FIG. 1.

Figure 5:
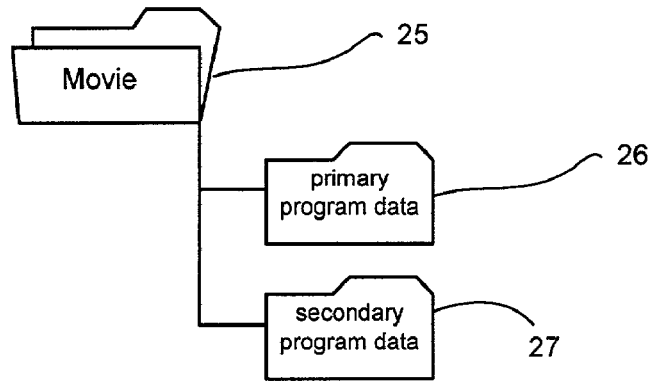
FIG. 5 illustrates a folder and file structure used for primary and secondary program data.

When a program is recorded on the hard drive 6, two related data files are stored in the same folder or linked together by coding, such as flags placed in the headers of the files. An example is shown in FIG. 5 in which a movie is recorded in a folder 25 that contains first and second files 26, 27. The first file 26 contains primary program data, corresponding to the program itself, while the second file 27 contains associated secondary program data corresponding to promotional material. For example, where the program data recorded in file 26 comprises a movie, the secondary data in file 27 may comprise a 30 s preview or trailer for the movie. In this example, both data files are in MPEG-2 format.

The secondary program data is transmitted in parallel with the primary program data to be recorded by the set top box 1. The secondary program data for the trailer may be transmitted at a lower resolution than the primary program data, for example, to provide a smaller display e.g. a quarter screen display when replayed and displayed on the television set 2.

Alternatively, the processor 8 may run an application to compile suitable promotional material by identifying portions of the primary program data that have been earmarked for this purpose and copying them to the secondary program data file. The material that has been earmarked in this way may be combined with further data from a parallel, tertiary broadcast, such as an audio soundtrack, to produce a trailer for the primary program data. Thus, the secondary program data is produced by copying the earmarked portion of the primary data, stripping away or substantially reducing in volume the audio track for the earmarked data and then overlaying it with the soundtrack that comprises the tertiary data. Thus, a promotional soundtrack can be combined with the earmarked video from the movie to provide the secondary data.

Figure 7:
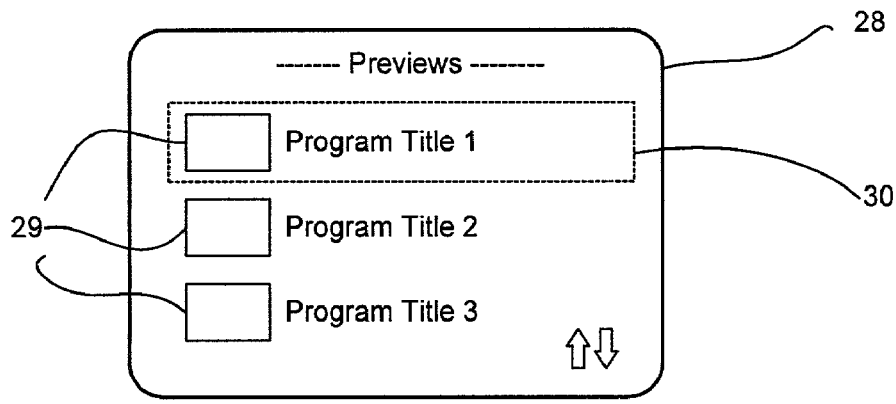
FIG. 6 is a flow diagram of the display of the secondary program data and the response to a resulting viewing decision and FIG. 7 depicts the menu of stored secondary program data as displayed to a user.
Figure 6:
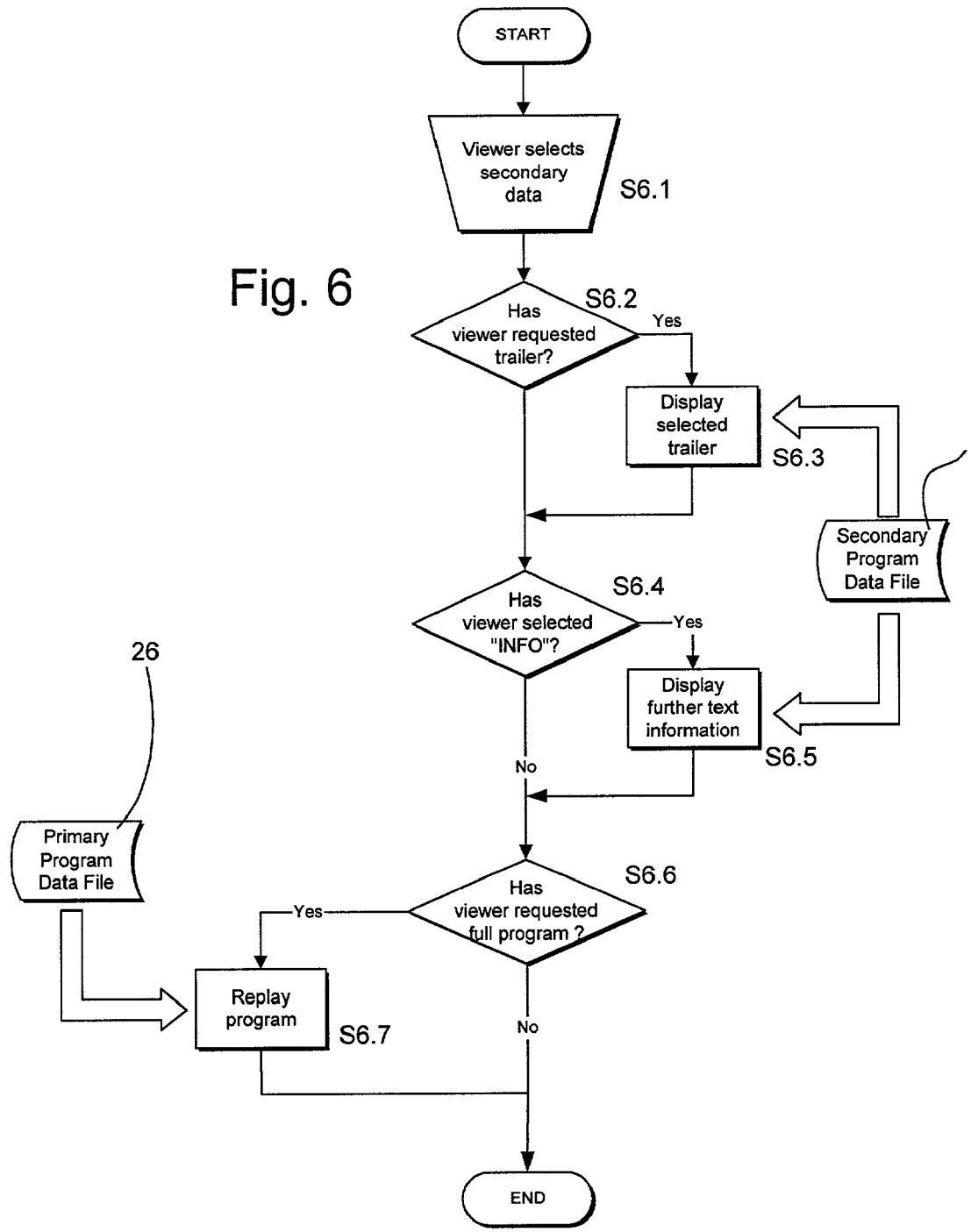

The retrieval of program data stored on the hard drive 6 is described with reference to FIGS. 6 and 7. An application directs the processor 8 to gather information relating to the secondary program data and present them in the form of a menu on screen 28 of the TV set 2. An example menu is shown in FIG. 7, where the titles of the programs and relevant pictures 29 are displayed. The user may scroll through the list and select a program title by moving a highlighted region 30 using a remote controller through interface device 19. The viewer may elect initially to watch the program itself i.e. the primary data or the corresponding secondary data, by the use of appropriate buttons on the remote controller and to facilitate this operation, the display shown in FIG. 7 may include an icon (not shown) associated with those of the program titles for which secondary data such as a trailer is available. The election of secondary data by the user is illustrated at step S6.1 in FIG. 6. If the user requests a trailer, and assuming that a trailer is available for the selected program title, then the corresponding secondary program data may be then retrieved from the relevant file 27 and displayed as shown at step S6.3 in FIG. 6.

The user may access further text information about the program while, or instead of, viewing the trailer by selecting an "INFO" option (S6.4, S6.5) by means of the remote controller. The viewer may also elect to watch the full program at any time by selecting a further option on the device 19 (S6.6), at which point the full program data 26 is retrieved from the hard disc and replayed (S6.7).

By providing easy access to promotional material such as previews, trailers and text information, the invention allows a user to make informed viewing decisions when faced with a large number of stored programs. For example, if a user goes on vacation for the weekend, the set top box 2 may be programmed to record 48 hours of primary programming data from one or more broadcast or cable channels. In accordance with the invention secondary programming data corresponding to trailers for the primary programming data is contemporaneously recorded enabling the user thereafter to review the recorded material and make a viewing selection. The invention also allows a content provider an opportunity to raise a viewer's interest in a stored program.

Many modifications and variations of the described example of the invention can be carried out. For example, the storage medium has been described as a magnetic storage medium but it will be understood that optical storage media such as writeable DVD can be used. Furthermore, different operating systems can be used, for example HPFS (high performance file system) from OS/2, NTFS, ISO9660, UDF and the filing system used for UNIX. In addition, the invention is not restricted to set top boxes and can be used for other multimedia devices which incorporate storage media for broadcast program content such as DVD recorders. Also the display need not be provided on a conventional television set and any other convenient display device could be used.

The invention claimed is:

1. An apparatus comprising:
   at least one processor; and
   at least one memory including computer program code,
   the at least one memory and the computer program code configured to, with the at least one processor, cause the apparatus to perform at least the following,
   record the primary program data on a storage medium,
   run a software agent arranged to identify and copy one or more portions of the primary program data that have been identified and earmarked by a broadcaster within the stored primary program,
   create and store a copy of said earmarked data as an associated secondary program data file on the storage medium,
   wherein the primary program data and the secondary program data are stored in separate files,
   subsequent to both the primary program data and the associated secondary program data having been stored on the storage medium, provide a user interface for selection of the stored primary program data, and
   upon the selection, retrieve the associated secondary program data for display.

2. The apparatus of claim 1, wherein the apparatus is further caused to replace at least a portion of audio data in the secondary program data with audio data from tertiary program data received from the communication channel.

3. The apparatus of claim 1, wherein the primary program data and secondary program data are in the form of MPEG-2 files.

4. The apparatus of claim 1, wherein the secondary program data is of a lower resolution than that of the primary program data.

5. The apparatus of claim 1, wherein the apparatus comprises a set top box.

6. The apparatus of claim 1, further including a display device configured to display the primary and secondary data retrieved from the storage medium.

7. A method comprising:
   receiving, at an apparatus, primary program data from a communication channel,
   storing, at the apparatus, the primary program data on a storage medium of the apparatus,
   running, at the apparatus, a software application so as to identify and copy one or more earmarked portions of the stored primary program data that are identified by a broadcaster within the stored primary program,
   creating and storing, at the apparatus, a copy of the earmarked portions as an associated secondary program data file on the storage medium, wherein the primary program data and the secondary program data are stored in separate files,
   subsequent to the storage of the primary program data and the associated secondary program data being complete, providing a user interface at the apparatus for selection of the stored primary program data, and
   upon the selection, retrieving said secondary program data for display said second program data at the apparatus.

8. The method of claim 7, including replacing at least a portion of audio data in the secondary program data with audio data from tertiary program data received from the communication channel.

9. The method of claim 7, where the secondary program data comprises promotional material in one or more of the following forms: audio, video, pictures, text or graphics.

10. The method of claim 7, where the primary program data and secondary program data are in the form of MPEG-2 files.

11. The method of claim 7, where the secondary program data is of a lower resolution than that of the primary program data.

12. A computer-readable storage medium carrying one or more sequences of one or more instructions which, when executed by one or more processors, cause the one or more processors to at least perform the following steps:
   receiving primary program data from a communication channel,
   storing the primary program data on a storage medium,
   running a software application so as to identify and copy one or more earmarked portions of the stored primary program data that are identified by a broadcaster within the stored primary program,
   creating and storing a copy of the earmarked portions as an associated secondary program data file on the storage medium, wherein the primary program data and the secondary program data are stored in separate files,
   subsequent to both the primary program data and the associated secondary program data having been stored on the storage medium, providing a user interface for selection of the stored program data, and
   upon selection retrieving the secondary program data for display.

13. An apparatus according to claim 1, wherein the apparatus is further caused to, subsequent to the storage of the primary program data and the associated secondary program data being complete, gather information relating to the associated secondary program data and display the information.

14. The apparatus according to claim 1, wherein the apparatus is further caused to display an icon associated with the primary program data for which the associated secondary program data is available.

15. The apparatus of claim 1, wherein the apparatus is further caused to provide the user interface for selection of program titles of the primary program data.

16. The method according to claim 7, further comprising, subsequent to the storage of the primary program data and the associated secondary program data being complete, gathering information relating to the associated secondary program data and displaying the information.

17. The method according to claim 7, further comprising displaying an icon associated with the primary program data for which the associated secondary program data is available.

18. The method of claim 7, wherein providing a user interface comprises providing the user interface for selection of program titles of the primary program data.

19. The computer-readable storage medium of claim 12, wherein the apparatus is caused to further perform: subsequent to the storage of the primary program data and the associated secondary program data being complete, gathering information relating to the associated secondary program data and display the information.

20. The computer-readable storage medium of claim 12, the apparatus is caused to further perform: displaying an icon associated with the primary program data for which the associated secondary program data is available.

21. A method comprising:
   receiving, at an apparatus, primary program data comprising a multimedia broadcast program, said primary program data further comprising earmarking data identifying a plurality of earmarked portions of the multimedia broadcast program as identified by a broadcaster within the multimedia broadcast program;
   storing, at the apparatus, the primary program data in a first data file;

based on the earmarking data, copying the plurality of earmarked portions of the multimedia broadcast program to create a second data file and store the second data file separately from the first data file at the apparatus;

providing a user interface at the apparatus that allows selection of the multimedia broadcast program and allows selection of the plurality of earmarked portions of the multimedia broadcast program;

receiving a selection via the user interface for one of: the multimedia broadcast program and the plurality of earmarked portions of the multimedia broadcast program;

based on the selection, accessing, at the apparatus, one of: the first data file and the second data file; and based on the selection, displaying, at the apparatus, one of: the multimedia broadcast program and the plurality of earmarked portions of the multimedia broadcast program.

22. The method of claim 21, wherein copying the plurality of earmarked portions of the multimedia broadcast program to the second data file comprises replacing at least a portion of audio data in the earmarked portions of the multimedia broadcast program with a separate audio soundtrack.

23. The method of claim 22, wherein the separate audio soundtrack is received from a same broadcaster as the primary program data in a separate parallel broadcast.

24. The method of claim 22, wherein the second data file corresponds to promotional content for the multimedia broadcast program.

25. The method of claim 21, wherein each of the plurality of earmarked portions corresponds to a separate sub-portion of the multimedia broadcast program.

26. The method of claim 21, wherein the first data file and the second data file are stored in a same folder in a memory.

27. The method of claim 21, further comprising linking the first data file and the second data file by inserting a linking identifier in a file header of at least one of the first data file and the second data file.

28. An apparatus comprising:
at least one processor; and
at least one memory including computer program code,
the at least one memory and the computer program code configured to, with the at least one processor, cause the apparatus to perform at least the following,
receive primary program data comprising a multimedia broadcast program, said primary program data further comprising earmarking data identifying a plurality of earmarked portions of the multimedia broadcast program as identified by a broadcaster within the multimedia broadcast program;
store the primary program data in a first data file in the memory of the apparatus;
based on the earmarking data, copying the plurality of earmarked portions of the multimedia broadcast program to create a second data file and store the second data file separately from the first data file in the memory of the apparatus;
provide a user interface that allows selection of the multimedia broadcast program and allows selection of the plurality of earmarked portions of the multimedia broadcast program;
receive a selection via the user interface for one of: the multimedia broadcast program and the plurality of earmarked portions of the multimedia broadcast program;
based on the selection, access one of: the first data file and the second data file; and
based on the selection, display one of: the multimedia broadcast program and the plurality of earmarked portions of the multimedia broadcast program.

29. The apparatus of claim 28, wherein the apparatus is further caused to: replace at least a portion of audio data in the earmarked portions of the multimedia broadcast program with a separate audio soundtrack.

30. The apparatus of claim 29, wherein the separate audio soundtrack is received from a same broadcaster as the primary program data in a separate parallel broadcast.

31. The apparatus of claim 29, wherein the second data file corresponds to promotional content for the multimedia broadcast program.

32. The apparatus of claim 28, wherein each of the plurality of earmarked portions corresponds to a separate sub-portion of the multimedia broadcast program.

33. The apparatus of claim 28, wherein the first data file and the second data file are stored in a same folder in the memory of the apparatus.

34. The apparatus of claim 28, wherein the apparatus is further caused to:
link the first data file and the second data file by inserting a linking identifier in a file header of at least one of the first data file and the second data file.

35. A computer-readable storage medium carrying one or more sequences of one or more instructions which, when executed by one or more processors, cause the one or more processors to at least perform the following steps:
receiving primary program data comprising a multimedia broadcast program, said primary program data further comprising earmarking data identifying a plurality of earmarked portions of the multimedia broadcast program as identified by a broadcaster within the multimedia broadcast program;
storing the primary program data in a first data file;
based on the earmarking data, copying the plurality of earmarked portions of the multimedia broadcast program to create a second data file and store the second data file separately from the first data file;
providing a user interface that allows selection of the multimedia broadcast program and allows selection of the plurality of earmarked portions of the multimedia broadcast program;
receiving a selection via the user interface for one of: the multimedia broadcast program and the plurality of earmarked portions of the multimedia broadcast program;
based on the selection, accessing one of: the first data file and the second data file; and
based on the selection, displaying one of: the multimedia broadcast program and the plurality of earmarked portions of the multimedia broadcast program.

36. The computer readable storage medium of claim 35, wherein the apparatus is caused to further perform: replacing at least a portion of audio data in the earmarked portions of the multimedia broadcast program with a separate audio soundtrack.

37. The computer readable storage medium of claim 36, wherein the separate audio soundtrack is received from a same broadcaster as the primary program data in a separate parallel broadcast.

38. The computer readable storage medium of claim 36, wherein the second data file corresponds to promotional content for the multimedia broadcast program.

39. The computer readable storage medium of claim 35, wherein each of the plurality of earmarked portions corre sponds to a separate sub-portion of the multimedia broadcast program.

40. The computer readable storage medium of claim 35, wherein the first data file and the second data file are stored in a same folder in a memory.

41. The computer readable storage medium of claim 35, the apparatus is caused to further perform: linking the first data file and the second data file by inserting a linking identifier in a file header of at least one of the first data file and the second data file.

42. The method of claim 7, wherein the earmarked portions of the stored primary program data are identified by the broadcaster based upon data content.

* * * * *